Patented July 23, 1940

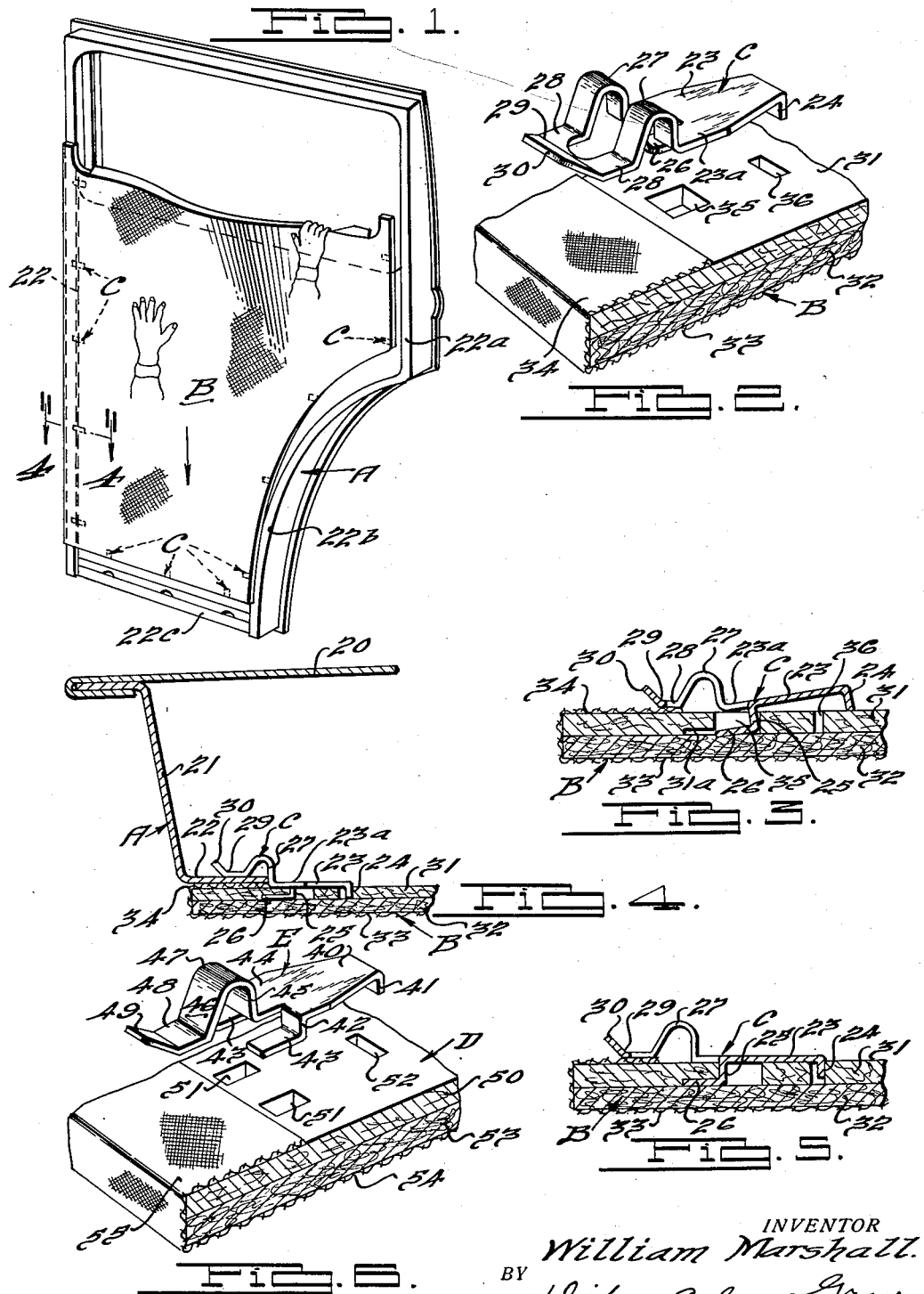

2,208,727

UNITED STATES PATENT OFFICE 2,208,727

TRIM FASTENER

William Marshall, Detroit, Mich., assignor to Briggs Manufacturing Company, Detroit, Mich., a corporation of Michigan Original application October 26, 1936, Serial No. 107,534. Divided and this application July 25, 1938, Serial No. 221,065

5 Claims. (Cl. 24—259)

This invention relates to trim panels or trim panel assemblies particularly adapted for use in the interior trim finish of automobiles or other vehicle bodies and especially to fastener devices for trim panels, and is a division of my co-pending application Serial No. 107,534, filed October 26, 1936.

An object of the invention is to provide a trim panel for a vehicle body including improved fastener means carried by the trim panel for removably attaching the panel to the vehicle door or other portion of the body framing within the interior of the vehicle body, the improved construction being such as to provide a relatively simple and inexpensive means whereby the trim panel may be easily installed on the body.

A further object of the invention is to provide a new and improved interior trim panel, or trim panel assembly, together with a new and improved fastener device for detachably securing the panel to the body so that by virtue of the invention there is provided a fastener device of relatively simple construction which may be manufactured at low cost and assembled on the panel with a minimum of time and labor and enabling the provision of a trim panel which may be easily applied to the door or other framing of the vehicle body.

Another object of the invention is to provide an improved fastener device for a trim panel which may be cheaply and easily manufactured from a single piece or strip of metal and which may be assembled on the trim panel after applying the trim material thereto without the necessity of using separate retainer or clip devices for holding the fastener element in place.

A further object of the invention is to provide an improved trim fastener for applying a trim panel to a supporting surface, the fastener being preferably stamped or formed from a single sheet metal blank and having means for anchoring the same in apertures in the panel foundation sheet, thereby providing a device which itself may be readily removed from the foundation sheet but which cannot be detached therefrom when the panel is mounted on the vehicle supporting surface.

The above and other objects of the invention will appear from the following description and appended claims when considered in connection with the accompanying drawing forming a part of this specification.

Fig. 1 is a perspective view of an automobile door and a trim panel embodying the present invention, and illustrating one method of assembling the trim panel on the door.

Fig. 2 is a perspective view of the fastener device embodying one form of the present invention preparatory to assembly on the trim panel backing sheet, a portion or fragment only of the backing sheet being shown.

Figs. 3 and 4 are fragmentary sectional views taken through the trim panel and illustrating the assembly of the fastener device of Fig. 2 with the backing sheet.

Fig. 5 is a view similar to Fig. 4, minus the support and on an enlarged scale, showing the fastener device of Fig. 3 in assembled relation upon the backing sheet of the trim panel; and Fig. 6 is a view similar to Fig. 2, showing a modified form of fastener device embodying the present invention.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring particularly to Figs. 1 to 5 inclusive of the drawing there is illustrated, by way of example, a vehicle door A having a trim panel B mounted thereon by means of fastener devices C, the latter being constructed in accordance with the present invention. It will be understood that the trim panels may be of different shapes and sizes and may be mounted upon any of the doors of an automobile or other vehicle body or at other locations on the inside of the body.

The trim panel B in the present embodiment is shown as installed upon a door A which comprises an outer metal panel 20 secured in the usual manner to the framing 21. As illustrated in Fig. 4 the framing at one side of the door is formed at its rear edge with an inturned flange 22. It will be understood that the framing at the opposite side of the door and at the bottom thereof is also constructed to provide similar flanging. At the side of the door opposite the flange 22 there is an inturned flange 22a, a flange 22b along a curved portion of the door which extends over the wheel housing, and also a flange 22c along the bottom of the door (see Fig. 1).

Referring particularly to Fig. 2, the fastener C of the present form comprises a one-piece device formed from a single metal strip or blank. The fastener comprises preferably a flat base portion or body 23 which, as shown, is tapered toward its rear end and provided at said rear end with a depending tongue or abutment 24 which forms the heel of the device. At the forward end of the base or body portion 23 and preferably located centrally thereof a metal tongue is formed having a depending portion providing an abutment 25 and a forwardly extending substantially horizontal portion 26. At opposite sides of the tongue or abutment 25, 26, the metal of the body portion has extensions 23a which are bent up at their forward ends and thence reversely bent to provide a pair of spaced spring bows 27. The metal of the strip is then extended forwardly at 28 in a plane substantially corresponding to that of the body portion 23 to provide a gripping member 29 which interconnects the forward legs of the substantially U-shaped members 27 and is bent upwardly at its forward end to provide a flaring lead member or end 30.

The trim fastener C is applied to and assembled with the trim panel B which in the present instance comprises a foundation or backing sheet 31 of fiberboard. The front face of the backing sheet is covered by means of a padding material 32 and this layer is in turn covered with a trim fabric 33 which is folded around the edges of the foundation sheet 23 as shown at 34, and cemented at the rear face of the foundation sheet along the edges thereof. At suitable points along the side and bottom edges of the trim panel and inwardly of the cemented edges 34 of the fabric material, the foundation sheet 31 is provided with pairs of holes or apertures 35 and 36 extending through the backing sheet. The aperture 35 in the present instance is substantially square in shape and the aperture 36, as shown, is preferably oblong. The apertures 35 and 36 are adapted to receive the depending tongue and abutment members 25, 26 and also the depending tongue or abutment 24. The distance from the front wall of the aperture 35 to the back wall of the aperture 36 is substantially equal to the distance between the depending abutments 25 and 24 of the fastener so that when the tongue 26 is inserted in the aperture 35 and the abutment 24 is pushed into the aperture 36, these parts of the fastener fit snugly in the apertures or openings and cause the fastener to grip the surface of the backing sheet.

The fastener C may be readily assembled on the trim panel B by first inserting the tongue or extension 26 which lies forwardly of the abutment 25, into the aperture 35 so as to extend beneath and underlap the forward edge of the aperture as shown in Fig. 3. The underface of the foundation sheet 31 is preferably undercut at 31a, see Fig. 3, so as to provide a space to receive the tongue 26 so that the outer face of the tongue will lie substantially flush with the corresponding face of the backing sheet 31 when the fastener is in place upon the panel. After inserting the fastener so that the tongue 26 will enter the groove or recess 31a as seen in Fig. 3, the fastener is shoved forwardly to bring the abutment 24 into register with the aperture 36. The rear end of the fastener is now pressed downwardly to move the abutment 24 into the aperture 36. The abutments 24 and 25 will tightly engage their respective aperture walls and hold the fastener tightly in position within the apertures. Moreover, since the extensions 23a overlie the forward side edges of the aperture 35, the fastener will be frictionally held in place against dislodgment before the trim panel is installed on the body.

Preparatory to the installation of the trim panel C on the door structure B or other part of the body, the trim panel, as shown in Fig. 1, is preferably provided with a suitable number of fasteners C along the side and bottom edges thereof. It will be understood that the fasteners are, in practice, installed after the trim fabric has been applied to the foundation sheet.

As illustrated in Fig. 1, the trim panel may be readily installed by inserting the flared or lead ends 30 of the gripping members behind the flange 22 along one vertical side of the door and then forcing the panel laterally, or to the left of Fig. 1, so as to force the gripping portions 29 of the fasteners over the back face of the flange. In this operation the gripping portions are pressed or sprung out so as to grip the flange 22 and clamp the back face of the foundation sheet firmly against the inner face of the flange 22 as illustrated in Fig. 4. The trim panel may then be bowed outwardly a sufficient extent to permit the fasteners C at the opposite vertical edge of the panel to engage behind the edge of the flange portion 22a. By then flattening out the panel these fasteners will be forced into gripping engagement with the flange 22a in the same manner as is shown in Fig. 4. The panel may then be slid downwardly so as to cause the gripping portions of the remaining fastener device to be forced beneath the gripping flanges 22b and 22c and to grip the same in the manner illustrated in Fig. 4. With the panel thus installed on the door it will be seen that the trim panel may not be pried loose from the door by inserting a tool beneath the edge of the panel because the forces against the gripping portions 29 tend to tilt the fasteners within their apertures 35 and 36 which merely causes the fasteners to grip or engage the foundation sheet more tightly. The panel may only be removed by substantially reversing the operation of assembly described above. Each fastener, however, may be removed from its frictional engagement with the trim panel apertures by inserting a tool under the tapered rear portion of the body 23 and releasing the abutment or tongue 24 from engagement with the aperture 36. Now by gripping the heel portion of the fastener and exerting a rearward pull thereon, the fastener may be completely released and removed from the panel. It will be understood that if desired the cut-out portion 31a in the trim panel foundation sheet may be dispensed with, in which case the tongue 26 would be forced into the space between the backing sheet and the padding material or layer.

Referring now particularly to Fig. 6, there is shown a somewhat modified form of fastener device embodying the present invention. In this form the fastener is shown as a whole at E and is adapted to be attached to a trim panel D. The fastener comprises a body portion 40 which tapers toward its rear end and has a depending tongue or abutment 41 extending at substantially a right angle thereto. The forward end of the body portion at its side edges is turned downwardly to provide a pair of spaced depending abutments 42 and then turned forwardly to provide a pair of spaced substantially horizontal tongues or projections 43. The metal of the central portion of the body 40 at its forward end is extended forwardly at 44 in the same plane as the body portion and is then bent upwardly at 45 and reversely bent downwardly and forwardly at 46 to provide a substantially U-shaped spring bow 47. The metal of the strip beyond the portion 46 is then extended forwardly to provide a gripping portion or member 48. The forward end of the gripping member or portion is bent upwardly to provide a flaring lead end 49.

The trim fastener E is applied to and assembled with a trim panel D which corresponds to the trim panel B of the preceding embodiment except for the fact that the backing sheet 50 is provided with a pair of rectangular holes or apertures 51 adjacent the folded over edge 55 of the trim fabric 54 and an inwardly spaced single rectangular aperture 52, all of the apertures extending through the backing sheet. The fastener E is assembled with the trim panel D in precisely the same manner as in the preceding form of the invention except that the two forwardly extending tongue members are first engaged with the apertures 51, the fastener slid forwardly toward the trim fabric edge 55 and the tongue or abutment 41 brought into register with and pushed into the aperture 52 so that the gripping portion 48 of the fastener engages the panel in the same manner as does the gripping portion 28, 29 of the preceding form of fastener device. The overlying and underlying parts 44 and 43 embrace opposite faces of the foundation sheet, as in the manner of the parts 23a and 26, and anchor the fastener against dislodgment.

I claim:

1. A trim fastener having a base comprising a relatively flat portion and abutments depending from opposite ends of said base, a tongue or tongues extended from an abutment in a plane substantially parallel to the plane of the base, and a spring gripping member extended from one end of said base, said gripping member having a substantially U-shaped portion in longitudinal section, one leg of said U-shaped portion extending substantially perpendicularly to said base end.

2. A trim fastener having a base comprising a relatively flat portion and abutments depending from opposite ends of said base, a tongue or tongues extended from an abutment in a plane substantially parallel to the plane of the base, and a spring gripping member extended from the end of said base adjacent said tongue or tongues, said gripping member having a substantially U-shaped portion in longitudinal section, one leg of said U-shaped portion extending substantially perpendicularly to said base end.

3. A trim fastener having a base comprising a relatively flat portion and abutments depending from opposite ends of said base, a tongue or tongues extended forwardly from an abutment in a plane substantially parallel to the plane of the base, and a spring gripping member extended from the end of said base adjacent said forwardly extending tongue or tongues, said gripping member comprising a lead portion and a spring bow, said spring bow being substantially U-shaped in longitudinal section and having at least one leg thereof extending substantially perpendicularly to said base end.

4. A trim fastener having a relatively flat base, an abutment extended from the rear end of the base, a second abutment extended from the front end of the base in the same direction as the first named abutment, a tongue extended from the second abutment in a plane substantially parallel to the plane of the base, and a spring gripping member extended from the front end of said base, said member comprising a pair of transversely spaced spring bows located at opposite sides of said tongue and a lead portion connecting said spring bows together.

5. A trim fastener having a relatively flat base, an abutment extended from the rear end of the base, a second abutment extended from the front end of the base in the same direction as the first named abutment, a tongue extended from the second abutment in a plane substantially parallel to the plane of the base, and a spring gripping member extended from the front end of said base, said member comprising a pair of transversely spaced spring bows located at opposite sides of said tongue and a lead portion extended upwardly and outwardly at an angle to said relatively flat base and connecting said spring bows together.

WILLIAM MARSHALL.